United States Patent
Blain et al.

(10) Patent No.: US 6,438,962 B1
(45) Date of Patent: Aug. 27, 2002

(54) SYSTEM AND METHOD FOR STARTING AN ENGINE

(75) Inventors: Edward S. Blain; Gary Goldberg; Branch Crooks, all of San Diego; Jayne Lanham, Ramona, all of CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 15 days.

(21) Appl. No.: 09/659,171

(22) Filed: Sep. 11, 2000

(51) Int. Cl.[7] .............................................. F02C 7/268
(52) U.S. Cl. .................................. 60/778; 60/788; 74/6
(58) Field of Search .......................... 60/39.02, 39.142, 60/778, 788; 74/6; 464/57, 59, 60

(56) References Cited

U.S. PATENT DOCUMENTS

| | | | |
|---|---|---|---|
| 1,116,370 A | * 11/1914 | Bendix | 74/6 |
| 1,216,416 A | * 2/1917 | Chalmers | 74/6 |
| 1,535,639 A | * 4/1925 | Weber | 454/59 |
| 2,452,298 A | 10/1948 | Goode | 60/41 |
| 2,577,964 A | 12/1951 | Heuer | 188/78 |
| 2,652,685 A | 9/1953 | Willgoos | 60/11 |
| 2,663,994 A | * 12/1953 | Lombard et al. | 60/39.142 |
| 4,776,574 A | 10/1988 | Krambeck | 267/156 |
| 5,172,543 A | 12/1992 | White | 60/39.02 |
| 5,267,433 A | 12/1993 | Burch | 60/39.142 |

FOREIGN PATENT DOCUMENTS

GB         151665         9/1919

OTHER PUBLICATIONS

Direct Current Machines, pp. 506–507.

* cited by examiner

Primary Examiner—Louis J. Casaregola
(74) Attorney, Agent, or Firm—Stephen G. Mican

(57) ABSTRACT

An engine starting system (100) includes a starter (106) coupled to an engine (102) through a rotational energy storage device (108) such as spiral spring (108). When electrical power is applied to the starter (106), the rotational energy produced by the starter (106) is stored in the rotational energy storage device (108) allowing the starter (106) to rotate which reduces electrical currents in the starter and stress on system components. The rotational energy is gradually transferred to the engine (102) until the engine (102) is rotationally self-sustaining.

17 Claims, 4 Drawing Sheets

SYSTEM AND METHOD FOR STARTING AN ENGINE

BACKGROUND OF THE INVENTION

The present invention relates to systems and methods for starting an engine and specifically to a system and method for reducing undesired effects resulting from an initial-engagement of a starter to an engine.

DESCRIPTION OF THE RELATED ART

Presently, various methods exist for starting engines. Engines such as diesel and gasoline combustion engines, and gas turbine engines must be externally rotated at a sufficient speed before they are self-sustaining. A starter such as an electric motor starter or an air starter is typically coupled to the engine through a clutch and is used to rotate the engine. The clutch engages the starter to the engine when the engine is started and disengages the starter from the engine when the engine is running. For example, most automobile engines incorporate an electric motor starter that is coupled to the engine through an overrunning clutch. When electric power is supplied to the electric motor starter from a battery, the electric motor starter begins to rotate which causes a gear on the motor shaft to engage a drive gear on the engine. The electric motor starter rotates the engine until the drive gear on the engine rotates faster than the gear on the electric motor starter, at which point the gear on the electric motor starter retracts away from the drive gear to disengage the electric starter motor from the engine.

Conventional starting systems, however, have several undesired effects resulting from the initial engagement between the starter and the engine. When the starter initially engages the engine, the inertia of the engine resists free rotation of the starter causing the starter to be stalled for a brief period of time. Mechanical components such as the clutch, gears and bearings can experience stress as a result of the high-impact forces produced by the initial engagement of the high-speed motor and the non-rotating engine. Further, in typical starting systems employing electric motor starters, the initial engagement causes high electrical currents to be drawn from the power supply. In addition to placing performance demands on the power supply, these high currents contribute to excessive brush heating in the electric motor starters.

When current is passed through the armature of a DC starter motor, the resulting magnetic field generates a torque, causing the armature to rotate. The revolution of the armature induces a counter electromotive force (emf) voltage in the armature windings that is opposite in polarity to the voltage applied to the armature by the power supply. The "back" emf voltage is directly proportional to the speed of the motor. The emf voltage is almost equal to the applied voltage and the current is relatively low at high speeds. At low speeds, the counter emf is low. Typically, the resistance of the armature winding and brush circuit is also low. This combination of conditions results in higher currents. The commutator bars in the motor expand as a result of the heat generated by the high current, causing the heated bars to expand beyond the diameter of the remaining commutator. As the commutator begins to rotate against the carbon brushes, the carbon brushes are scraped by the extended copper bars resulting in undesired brush wear and a decreased life of the electric motor starter.

These undesired effects are especially significant in auxiliary power units (APUs) used in aircraft. APUs provide electrical, hydraulic and pneumatic power to the aircraft when the aircraft is on the ground. In addition, the APUs may be required to provide any combination of these powers in emergency situations while the aircraft is in flight. Accordingly, the gas turbine engines used in APUs must be designed and maintained to start at high altitudes where air is oxygen poor and temperatures are extremely low. These extreme requirements, coupled with the potential loss of life, often require the APUs to be in optimum condition at all times. In addition, removal of the APUs from the aircraft is expensive and time consuming.

Electric motor starters used in starting systems for gas turbine engines are particularly susceptible to high inrush currents and excessive brush wear. The rotational speed of a gas turbine engine must be increased to approximately 60% of the engine's normal operating speed before the engine becomes totally self-sustaining. One known starting method involves the use of an electric DC starter motor directly coupled to the gas turbine engine through a gear and clutch assembly. Battery power is applied to the electric starter motor to produce a torque at the output of a drive shaft of the starter motor. The torque is coupled to the engine through a drive gear on the engine until the engine has started. Conventional gas turbine engine starter designs utilize high speed direct current (DC) series wound electrical motors. Due to the inertia of the APU and gearbox drag, electric motors cannot provide the necessary torque to rotate the gas turbine engine when the starter initially engages the gas turbine engine. Accordingly, extremely high currents flow through the armature windings and commutator bars when the electric motor starter is briefly stalled by the rotational inertia of the gas turbine engine. In some conventional 28V DC APU systems, the inrush current in the armature windings may be as high as 900 amperes resulting in significant brush wear. The component stress and brush wear resulting from the initial engagement between the starter and the gas turbine engine require the APU starters to be frequently inspected and replaced.

Therefore, there exists a need for an engine starting system that is less susceptible to the impulse forces and thermal effects which are encountered during the initial engagement between the starter and the engine.

SUMMARY OF THE INVENTION

The present invention relates to an engine starting system and method for reducing undesired effects resulting from the initial engagement of the starter to the engine.

In an exemplary embodiment, an electric motor starter is coupled to a gas turbine engine through a spiral spring and an overrunning clutch. A first end of the spiral spring is connected to a drive shaft of the electric motor starter and a second end of the spiral spring is coupled through a spring hub by the overrunning clutch. When a supply voltage is applied to the electric motor starter from a battery, the motor begins to rotate. Initially, the overrunning clutch engages the engine and the second end of the spiral spring is briefly motionless due to the inertia of the engine. Rotational energy is stored in the spiral spring as the motor rotates. The motor continues to rotate as rotational energy is transferred form the spiral spring and motor to the engine. The rotational speed of the engine increases as more rotational energy is transferred to the engine. When the engine is self-sustaining and rotates faster than the starter, the overrunning clutch disengages from the engine.

Therefore, the electric motor starter is allowed to rotate during the initial stages of the engine starting sequence while forces due to the high impact engagement are minimized. The rotational energy from the electric motor starter is stored in the spiral spring and is gradually transferred to the engine. Since the motor is coupled to the engine through the spiral spring, initial duration of current through the brushes, armature windings and the commutator bars of the motor is reduced. Further, the wear on the carbon brushes is minimized since the temperature increase of the commutator bars is reduced.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which.

DESCRIPTION OF THE PREFERRED EMBODIMENT

Figure 1:
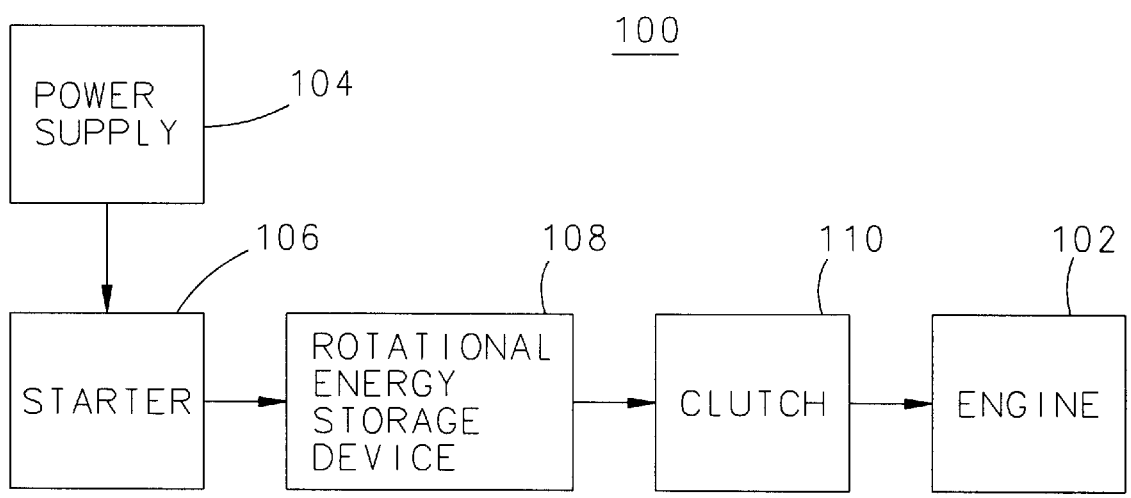
FIG. 1 is a block diagram of a starting system in accordance with a preferred embodiment of the invention.

FIG. 1 illustrates a block diagram of an engine starting system 100 in accordance with a preferred embodiment of the present invention. Although in the preferred embodiment, the engine starting system 100 is used to start a gas turbine engine typically used in auxiliary power units (APUs), the starting system 100 may be used to start a variety of engines 102 including other types of gas turbine engines, gasoline combustion and diesel engines. An example of an APU is described in U.S. Pat. No. 5,235,803 issued to Colin Rodgers. In the first embodiment, a power supply 104, such as battery, is connected to a starter 106 that is, preferably, a direct current series starter motor. The starter 106 may, however, be any one of a variety of starters such as a DC compound motor or an air starter. An air starter doesn't have the same startup problem as electric. Rotational energy produced by the starter is stored in a rotational energy storage device 108 which, in the preferred embodiment, is a spiral spring.

A clutch 110 couples the rotational energy stored in the rotational energy storage device 108 to the engine 102. The starter 106 is not loaded by the inertia of the engine 102 during the initial stages of the engine starting sequence since the rotational energy storage device 108 allows the starter 106 to spin at a high speed while absorbing the rotational energy. In other words, the rotational energy storage device 108 acts somewhat as a buffer between the high-speed starter 106 and the non-rotating engine 102. When the stored rotational energy within the rotation energy storage device 108 reaches a predetermined threshold, the rotational energy initiates rotation of the engine 102. Typically, the predetermined threshold is related to the characteristics of the rotational energy storage device 108, the characteristics of the starter 106 and the inertial rotating mass of the engine 102. The stored rotational energy is transferred to the engine 102 causing the engine 102 to rotate. The starter 106 continues to turn, adding rotational energy through the rotational energy storage device 108 to the engine, until the engine 102 is self-sustaining (operating under its own power).

In the preferred embodiment, the clutch 110 is an overrunning clutch that decouples the rotational energy storage device 108 from the engine 102 when the engine 102 is self-sustaining. The clutch 110 disengages the rotational energy storage device 108 from the engine 102 when the speed of the engine 102 has exceeded the speed of the potential energy storage device 108.

In a first alternate embodiment, the positions of the clutch 110 and the rotational storage device 108 are interchanged. The first alternate embodiment operates as described above except that when the speed of the rotational energy storage device 108 exceeds the speed of the starter 107, the clutch 110 disengages the starter 106 from the rotational energy storage device 108. Therefore, in the first alternate embodiment, the rotational energy storage device 108 is directly coupled to the engine 102 and the starter 106 engages the rotational energy storage device 108 through the clutch 110.

Although in the preferred embodiment the rotational energy storage device is a spiral spring (sometimes referred to as a "clock spring"), the rotational energy storage device 108 may be any type of device capable of storing rotational energy. For example, the rotational energy storage device 108 may be an elongated flexible shaft that couples the starter 106 to the clutch 110. When the starter 106 rotates, the flexible shaft twists storing rotational energy. As the flexible shaft returns to its normal shape, the rotational energy is transferred to the engine 102. Other rotational energy storage devices 108 may include elastic materials capable of being deformed by the rotational energy from the starter 106, storing energy and gradually releasing the stored energy to the engine 102 and mechanical assemblies that can convert rotational energy into potential energy and release the potential energy as rotational energy to the engine 102.

Figure 2:
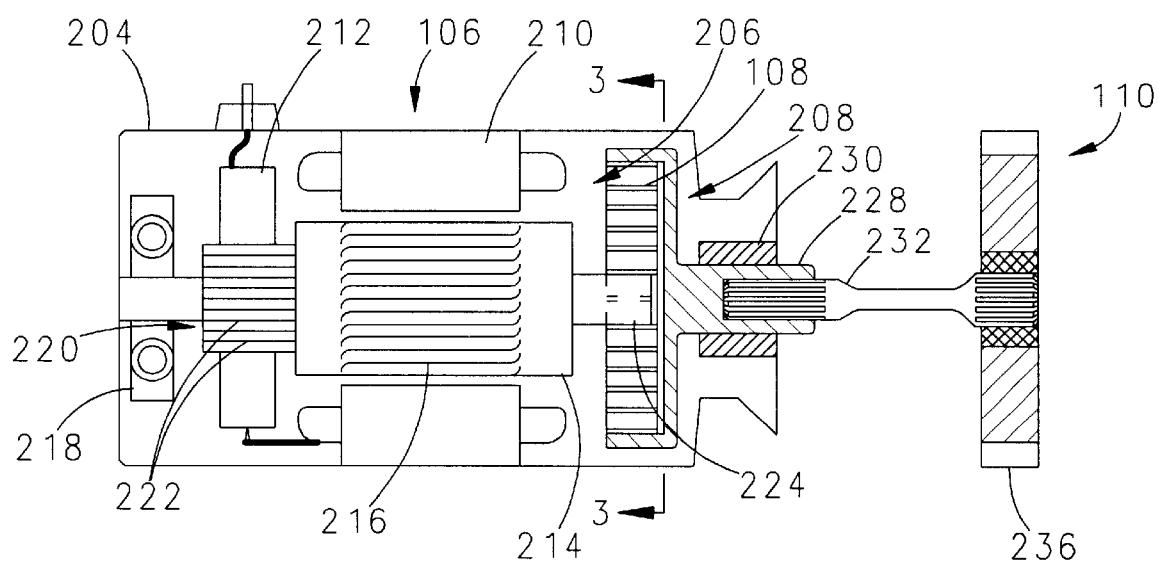
FIG. 2 is a detailed block diagram of the starter coupled to the clutch 110 in accordance with the preferred embodiment of the invention.

FIG. 2 is a diagram of the starter 106 interfaced to the clutch 110 in accordance with the preferred embodiment of the present invention. In the preferred embodiment, the rotational energy storage device 108 is a spiral spring 108.

As discussed above, the starter 106 is an electric motor starter 106 in the preferred embodiment. An electric motor assembly 206 and a spring assembly 208 are contained within a housing 204. The electric motor assembly 206 includes a stator 210, carbon brushes 212, and an armature 214 having armature windings 216. The stator 210 is mounted on an inside surface of the housing 204. The armature 214 rotates on bearings 218 in the center of the housing 204. A commutator 220 is attached to the armature 214 and has commutator bars 222 which are electrically coupled to the armature windings 216. The carbon brushes 212 contact the commutator bars 222 and are preferably mounted to the housing 204 through compression springs (not shown). Although in the preferred embodiment the spring assembly 208 and the motor assembly 206 are contained within a single housing 204, the spring assembly 208 may be housed in a separate housing. In such an alternate embodiment, the drive shaft 224 extends past the front of the electric motor housing into a spring assembly housing to couple the motor assembly 206 to the spring assembly 208.

A drive shaft 224 of the electric motor assembly 206 is coupled to the spring assembly 208 which includes the spiral spring 108 and a spring hub 228. The spring hub 228 rotates on bearings 230 mounted in the housing 204. As will be discussed below in more detail, a first end of the spiral spring 108 is connected to the drive shaft 224 and a second end of the spiral spring 108 is connected to the spring hub 228.

Preferably, the spring hub 228 has a splined inner receptacle for receiving a first end of a splined extension shaft 232. A second end of the extension shaft 232 is also splined and couples the extension shaft 232 to an overrunning clutch 110. Although in the preferred embodiment the clutch 110 is an overrunning Sprague clutch, any one of several known overrunning clutches may be used. The clutch 110 engages and disengages the extension shaft 232 to a drive gear 236 on the gas turbine engine 102 based on the relative rotational speed between the extension shaft 232 and the drive gear 236. The clutch 110 disengages the spring assembly 208 from the engine 102 when the engine 102 speed exceeds the speed of the spring hub 228.

When electric power is applied to the starter 106, a magnetic field is produced by the stator 210. An electric current directed through the commutator 220 to the armature windings 216 in conjunction with the magnetic field produces a rotational force on the armature 214. As the armature 214 begins to rotate, the carbon brushes 212 contact a different set of commutator bars 222 to maintain an optimum rotational force on the armature 214. The rotational force causes the spring assembly 208 and the extension shaft 232 to rotate until the clutch 110 engages the drive gear 236 of the gas turbine engine 102. The gas turbine engine 102 has a high inertia due to its large mass. Accordingly, the extension shaft 232 and the spring hub 228 do not rotate at the same speed as the motor assembly 206 during the initial stages of the starting operation. Since the spring hub 228 and the second end of the spiral spring 108 are nearly motionless due to the inertia of the gas turbine engine 102, the rotational force produced by the motor assembly 206 is transferred into the spiral spring 108 by tightening the spiral spring 108. Rotational energy produced by the rotating armature 214 is stored in the spiral spring 108. The rotational energy is gradually transferred to the gas turbine engine 102 causing the gas turbine engine 102 to rotate. When the rotational speed of the gas turbine engine 102 increases and the rotational speed of the motor assembly 206 reaches a maximum limit (approximately 17,000 r.p.m.), the spiral spring 108 begins to uncoil.

As is known, during the stages of the starting sequence of a gas turbine engine, fuel is injected into the gas turbine engine and ignited during a "light off window". This allows the gas turbine 102 engine to begin rotating under its own power and increase in rotational speed with starter assist. The gas turbine engine 102, however, does not become self-sustaining (running) until it rotates approximately 50% of its operating speed. Accordingly, rotational energy is transferred from the spring assembly 208 to the gas turbine engine 102 until the gas turbine engine 102 is self-sustaining.

After the engine 102 has started, the spiral spring 108 unwinds thereby turning the clutch 110 although the clutch 110 has disengaged the spring hub 228 from the engine 102. The spiral spring 108, therefore, is placed in an unwound state and prepared for the next starting sequence.

Figure 3:
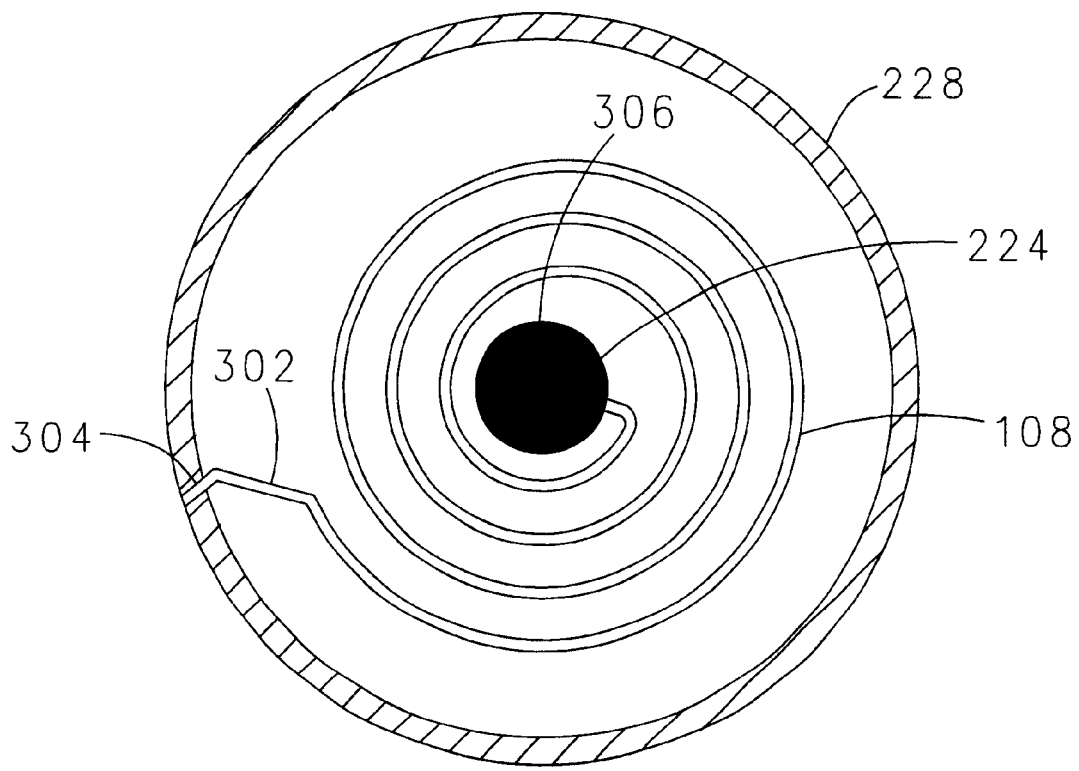
FIG. 3 is a cross-sectional drawing of the spring assembly in accordance with the preferred embodiment of the invention.

FIG. 3 is a drawing of a cross-sectional view of the spring assembly 208 interfaced with the drive shaft 224 in accordance with the preferred embodiment of the invention. As shown in FIG. 3, the spiral spring 108 is coiled within the spring hub 228. Preferably, the spiral spring 108 material is made from spring steel and is manufactured using known techniques. The spiral spring 108 has a shape that does not allow the spiral spring 108 to be permanently deformed when the spiral spring 108 is coiled tightly around the drive shaft 224. Preferably, the spiral spring 108 includes a linear section 302 that does not deform when the spiral spring 108 is wound. Without a linear section 302, it is possible that the second end of the spring 108 would be stressed by the changes between the wound state and the unwound states. When the spring 108 is wound, a force is produced that pulls the second end of the spiral spring 108 toward the drive shaft 224. Therefore, the spiral spring 108 is shaped such that this force does not deform the spiral spring 108. Although in the preferred embodiment the spiral spring 108 has a linear section 302, the spiral spring 108 may have any one of a variety of shapes that will not allow the spiral spring 108 to become permanently deformed during the winding process. For example, the spiral spring 108 may have a sufficient length such that the second end of the spiral spring 108 is not pulled toward the drive shaft 224 in the wound state.

The spiral spring 108 is attached to the spring hub 228 by inserting the second end of the spring 108 into a notch 304 in the spring hub 228. The first end of the spiral spring 108 is inserted into a slot 306 within the drive shaft 224 to attached the spiral spring 108 to the motor assembly 206.

Therefore, the spring assembly 208 includes the spiral spring 108 coiled within the spring hub 228 where one end of the spiral spring 108 is connected to the drive shaft 224 of the electric motor assembly 206, and the other end of the spiral spring 108 is connected to the spring hub 228. When the drive shaft 224 rotates during the initial stages of the starting sequence, the spiral spring 108 tightens by coiling around the drive shaft 224.

Figure 4:
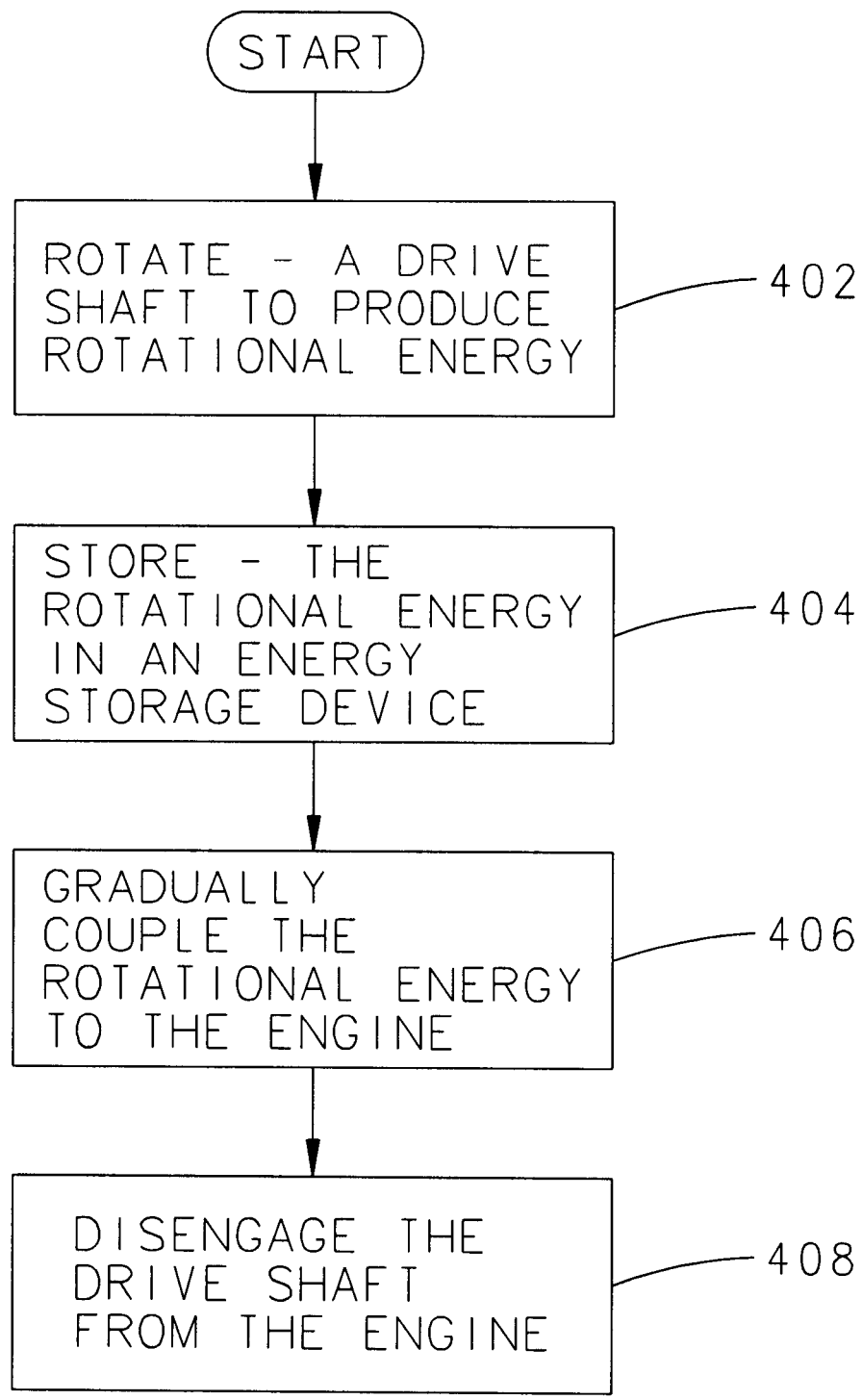
FIG. 4 is a flow chart of a method for starting an engine in accordance with the preferred embodiment of the invention.

A flow chart showing a starting sequence involving rotational energy in accordance with the preferred embodiment is provided in FIG. 4. At step 402, the drive shaft 224 of the starter 106 is rotated to produce rotational energy (torque). As previously described, in the preferred embodiment, the starter 106 is a DC series electric motor starter 106 and the drive shaft 224 is rotated by applying power to the electric motor starter 106 to produce a magnetic field.

At step 404, the rotational energy is stored in an energy storage device 108. In the preferred embodiment, the rotational energy storage device 108 is a spiral spring 108. The spiral spring 108 is coupled to the engine 102 by engaging the spring hub to the drive gear 236 of the engine 102. Because of the inertia of the engine 102, the engine does not immediately rotate when the spring hub engages the engine 102. Accordingly, the rotational energy is stored in the spring 108 as the spring 108 tightens by coiling around the drive shaft 224.

The rotational energy is gradually transferred to the engine 102 at step 406. As discussed above, the spring 108 gradually transfers the rotational energy to the engine 102 as it unwinds when the relative speeds between the engine 102 and the starter 107 decreases.

At step 408, the drive shaft 224 is disengaged from the engine 102 when the engine 102 becomes self-sustaining. In the preferred embodiment, an overrunning clutch 110 disengages the spring assembly 208 from the engine 102 when the engine 102 speed exceeds the speed of the spring hub 228.

According to the present invention, the electric motor starter 106 is allowed to begin rotation sooner during the initial stages of the engine 102 starting sequence reducing the duration of electrical current levels within the motor and wear on the carbon brushes increasing the life of the electric motor. Fewer demands are placed on the power supply (104)

because of the reduced current level duration occurring during the initial stages of the starting sequence. Wear on components such as the drive shaft, clutch, bearings, and gears are reduced by minimizing the forces due to the high-impact engagement of the starter 106 to the engine 102. In applications such as APU starting systems, the starter 106 components of the starting system 100 and the engine 102 are more reliable and require less maintenance than prior art systems.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. For example, the positions of the clutch 110 and the rotational energy storage device 108 can be interchanged without departing from the scope of the invention. Therefore, this invention is to be limited only by the following claims, which include all such other embodiments and modifications when viewed in conjunction with the above specification and accompanying drawings.

We claim:

1. An engine starting system comprising:
   a starter having a drive shaft;
   a rotational energy storage device connected to the drive shaft; and
   an overrunning clutch coupling the rotational energy storage device to an engine.

2. An engine starting system in accordance with claim 1, wherein the starter is an electric motor starter.

3. An engine starting system in accordance with claim 1, wherein the rotational energy storage device is a spiral spring.

4. An engine starting system in accordance with claim 1, wherein the clutch is a Sprague clutch.

5. An engine starting system for starting a gas turbine engine comprising:
   an electric motor starter having a drive shaft;
   a spiral spring having a first end and a second end, the first end of the spiral spring is coupled to the drive shaft;
   a spring hub coupled to the second end of the spiral spring; and
   an overrunning clutch coupled to the spring hub, the overrunning clutch adapted to couple rotational energy from the spring hub to the gas turbine engine until the engine is rotationally self-sustaining.

6. An engine starting system in accordance with claim 5, wherein the spiral spring is coiled within the spring hub.

7. An engine starting system in accordance with claim 6, wherein the spiral spring is adapted to absorb rotational energy to allow the drive shaft to rotate.

8. An engine starting system in accordance with claim 7, wherein the spiral spring is adapted to gradually couple the rotational energy to the spring hub.

9. An engine starting system in accordance with claim 8, wherein the spring hub and the spring are contained within a housing of the electric motor starter.

10. A direct current electric motor starter for starting an engine, the starter comprising:
    an electric motor assembly having a drive shaft;
    a spiral spring coiled within a spring hub, the spring having a first end connected to the drive shaft and having a second end connected to the spring hub; and
    a housing enclosing the spring hub and the electric motor assembly, wherein the spring hub is adapted to interface to an engine.

11. A direct current electric motor starter in accordance with claim 10, wherein the spring hub is adapted to interface to the engine through a clutch.

12. A direct current electric motor starter in accordance with claim 10, wherein the electric motor assembly comprises:
    an armature having armature windings connected to a commutator having commutator bars;
    carbon brushes contacting the commutator; and
    a stator mounted to an inside surface to the housing.

13. A direct current electric motor starter in accordance with claim 12, wherein the spiral spring is adapted to store rotational energy when the spring hub initially engages the engine during an engine starting sequence allowing the armature to rotate.

14. A direct current electric motor starter in accordance with claim 13, wherein the spiral spring is adapted to transfer the rotational energy to the engine.

15. A method of starting a gas turbine engine comprising the steps of:
    rotating a drive shaft of an electrical starting motor to produce rotational energy; storing the rotational energy in a spring;
    gradually coupling, through an overrunning clutch, the rotational energy to a drive gear of the gas turbine engine until the gas turbine engine is self-sustaining.

16. A method in accordance with claim 15, further comprising the step of disengaging the spring from the engine when the engine is rotationally self-sustaining.

17. A method in accordance with claim 16 wherein the step of storing the rotational energy comprises the step of tightening the spring by coiling the spring around the drive shaft.

* * * * *